United States Patent
Shin et al.

(10) Patent No.: US 12,280,800 B2
(45) Date of Patent: Apr. 22, 2025

(54) METHOD FOR DRIVING IN BLIND SPOT OF SENSOR MOUNTED ON AUTONOMOUS VEHICLE VIA COMMUNICATION WITH SERVER AND COMPUTING DEVICE USING THE SAME

(71) Applicant: Autonomous A2Z, Gyeongsan-si (KR)

(72) Inventors: Ki Cheol Shin, Seongnam-si (KR); Myeong Seon Heo, Seoul (KR); Byung Yong You, Seongnam-si (KR); Ji Hyeong Han, Anyang-si (KR)

(73) Assignee: Autonomous A2Z, Gyeongsan-si (KR)

( * ) Notice: Subject to any disclaimer, the term of this patent is extended or adjusted under 35 U.S.C. 154(b) by 254 days.

(21) Appl. No.: 17/962,713

(22) Filed: Oct. 10, 2022

(65) Prior Publication Data
US 2024/0075953 A1 Mar. 7, 2024

(30) Foreign Application Priority Data
Sep. 6, 2022 (KR) .......... 10-2022-0112878

(51) Int. Cl.
*B60W 60/00* (2020.01)
(52) U.S. Cl.
CPC ..... *B60W 60/0015* (2020.02); *B60W 2520/06* (2013.01); *B60W 2520/10* (2013.01); *B60W 2552/50* (2020.02); *B60W 2554/20* (2020.02); *B60W 2554/4044* (2020.02); *B60W 2554/802* (2020.02); *B60W 2555/60* (2020.02); *B60W 2556/40* (2020.02); *B60W 2556/45* (2020.02);
(Continued)

(58) Field of Classification Search
CPC ......... B60W 60/0015; B60W 2556/40; B60W 2554/4044; B60W 2556/45; B60W 2555/802; B60W 2552/50; B60W 2520/06; B60W 2520/10
See application file for complete search history.

(56) References Cited

U.S. PATENT DOCUMENTS

2018/0307245 A1* 10/2018 Khawaja ................. G08G 1/162
2022/0206502 A1* 6/2022 Zhang ...................... G08G 1/164
(Continued)

FOREIGN PATENT DOCUMENTS

KR 10-2020-0075105 A 6/2020

*Primary Examiner* — Peter D Nolan
*Assistant Examiner* — Mikko Okechukwu Obioha
(74) *Attorney, Agent, or Firm* — Rimon P.C.

(57) ABSTRACT

A method for driving in a blind spot of a sensor mounted on an autonomous vehicle is provided. The method includes steps of: a computing device of the autonomous vehicle running on a specific road locating the autonomous vehicle from precision map information, sensor information and GPS information, and in response to determining that the autonomous vehicle is expected to encounter a specific event, transmitting vehicle location data, travelling direction data, vehicle structure data and sensor location data and sensor's viewing angle data to the server, to determine whether a region of interest corresponding to the specific event is included in blind spot candidates; receiving blind spot stereoscopic data, computed from the data received from the autonomous vehicle and 3D occlusion environmental data corresponding to occluding static objects in the blind spot candidates, from the server; and controlling movement of the autonomous vehicle based on the blind spot stereoscopic data.

14 Claims, 15 Drawing Sheets

(52) U.S. Cl.
CPC ... *B60W 2720/10* (2013.01); *B60W 2720/106* (2013.01)

(56) References Cited

U.S. PATENT DOCUMENTS

2024/0067175 A1\* 2/2024 Inoue ................ B60W 30/0956
2024/0282197 A1\* 8/2024 Xia ........................ G08G 1/048

\* cited by examiner

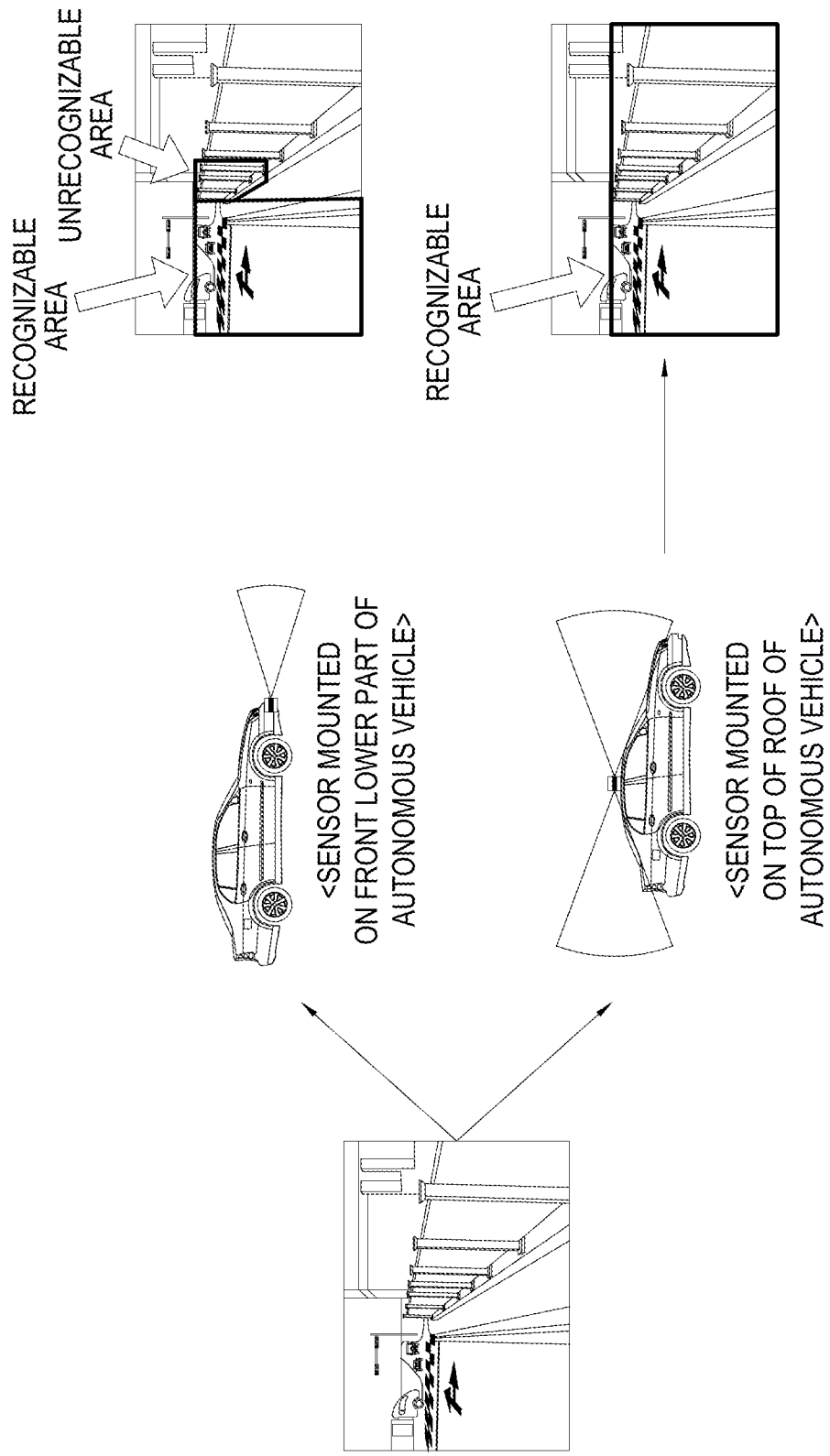

FIG. 2A
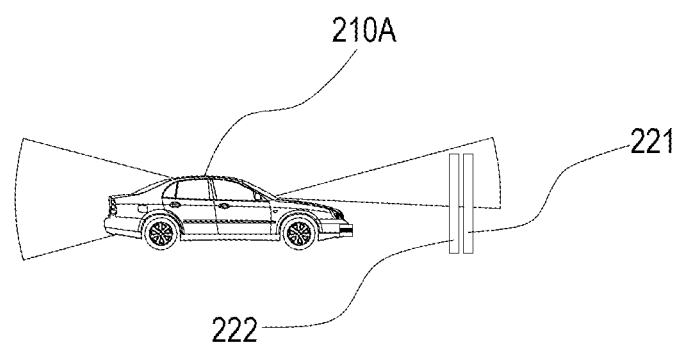
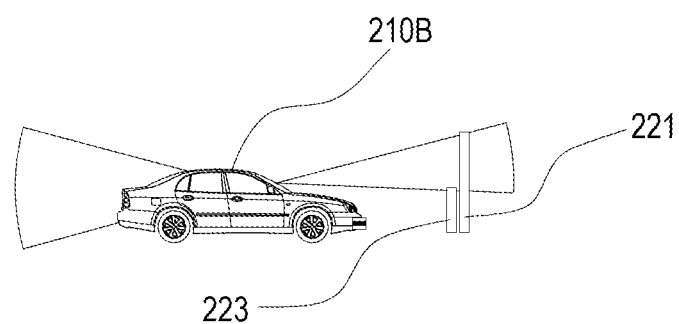

FIG. 4

A COMPUTING DEVICE OF THE AUTONOMOUS VEHICLE RUNNING ON A SPECIFIC ROAD (I) LOCATING THE AUTONOMOUS VEHICLE BY USING AT LEAST ONE OF PRECISION MAP INFORMATION, SENSOR INFORMATION AND GPS INFORMATION, AND (II) IN RESPONSE TO DETERMINING, AS A RESULT OF LOCATING THE AUTONOMOUS VEHICLE, THAT THE AUTONOMOUS VEHICLE IS EXPECTED TO ENCOUNTER A SPECIFIC EVENT WITHIN A SPECIFIC TIME PERIOD, TRANSMITTING VEHICLE LOCATION DATA CORRESPONDING TO THE RESULT OF LOCATING THE AUTONOMOUS VEHICLE, SENSOR LOCATION DATA CORRESPONDING TO A LOCATION WHERE A SENSOR IS MOUNTED ON THE AUTONOMOUS VEHICLE, DIRECTION DATA CORRESPONDING TO A TRAVELLING DIRECTION OF THE AUTONOMOUS VEHICLE, VEHICLE STRUCTURE DATA OF THE AUTONOMOUS VEHICLE AND VIEWING ANGLE DATA OF THE SENSOR TO A SERVER, TO THEREBY QUERY THE SERVER TO DETERMINE WHETHER A REGION OF INTEREST CORRESPONDING TO THE SPECIFIC EVENT IS INCLUDED IN BLIND SPOT CANDIDATES FOR THE BLIND SPOT OF THE SENSOR — S410

THE COMPUTING DEVICE RECEIVING BLIND SPOT STEREOSCOPIC DATA FROM THE SERVER, WHEREIN THE BLIND SPOT STEREOSCOPIC DATA IS COMPUTED BY REFERRING TO THE VEHICLE LOCATION DATA, THE SENSOR LOCATION DATA, THE DIRECTION DATA, THE VEHICLE STRUCTURE DATA, THE VIEWING ANGLE DATA AND 3D OCCLUSION ENVIRONMENTAL DATA CORRESPONDING TO AT LEAST ONE OCCLUDING STATIC OBJECT INCLUDED IN THE BLIND SPOT CANDIDATES — S420

THE COMPUTING DEVICE CONTROLLING MOVEMENT OF THE AUTONOMOUS VEHICLE BY REFERRING TO THE BLIND SPOT STEREOSCOPIC DATA SO THAT THE AUTONOMOUS VEHICLE DRIVES IN THE BLIND SPOT — S430

<VERTICAL-DIRECTION VIEWING ANGLE>

<HORIZONTAL-DIRECTION VIEWING ANGLE>

METHOD FOR DRIVING IN BLIND SPOT OF SENSOR MOUNTED ON AUTONOMOUS VEHICLE VIA COMMUNICATION WITH SERVER AND COMPUTING DEVICE USING THE SAME

CROSS REFERENCE OF RELATED APPLICATION

This present application claims the benefit of the earlier filing date of Korean provisional patent application No. 10-2022-0112878, filed Sep. 6, 2022, the entire contents of which being incorporated herein by reference.

FIELD OF THE DISCLOSURE

The present disclosure relates to a method for driving in a blind spot of a sensor, mounted on an autonomous vehicle, via communication with a server and a computing device using the same; and more particularly, to the method for driving in the blind spot by determining via the server whether a region of interest corresponding to a specific event, expected to be encountered by the autonomous vehicle within a specific time period during driving, is included in the blind spot, and the computing device using the same.

BACKGROUND OF THE DISCLOSURE

Despite there being significant technological advancements in the field of autonomous driving, autonomous vehicles being tested on real roads are still found to be often incapable of adequately coping with unexpected situations encountered on real roads. When problems arise due to blind spots caused by roadside structures during driving, there are cases where the problems are analyzed and solved by using precision maps utilized by the autonomous vehicles and sensors installed on the autonomous vehicles. However, since levels of precision for the precision maps are determined by how accurate the autonomous vehicles are able to process map information, accuracy levels of perception may vary for each autonomous vehicle. Also, a type, a performance and an installation location of the sensors are all different for each autonomous vehicle.

This being the case, it is hard to guarantee that the autonomous vehicles are able to accurately recognize and respond to the blind spots without failures.

Therefore, an enhanced method for solving the aforementioned problems is required.

SUMMARY OF THE DISCLOSURE

It is an object of the present disclosure to solve all the aforementioned problems.

It is another object of the present disclosure to allow an autonomous vehicle to receive blind spot stereoscopic data, including data on a horizontal-direction occluding region and data on a vertical-direction occluding region, from a server.

It is still another object of the present disclosure to compare estimated time taken for the autonomous vehicle and estimated time taken for a vertical object present in a blind spot to respectively encounter a specific event by referring to the blind spot stereoscopic data, to thereby control a speed of the autonomous vehicle.

It is still yet another object of the present disclosure to transmit an installation location of the sensor on the autonomous vehicle, specifications of the sensor and location information of the autonomous vehicle to the server and receive information on the blind spot as a result, thereby greatly saving the amount of data transmitted and received and enabling the autonomous vehicle to receive data on real-time while driving.

In accordance with one aspect of the present disclosure, there is provided a method for driving in a blind spot of a sensor, mounted on an autonomous vehicle, via communication with a server, including steps of: (a) a computing device of the autonomous vehicle running on a specific road (i) locating the autonomous vehicle by using at least one of precision map information, sensor information and GPS (Global Positioning System) information, and (ii) in response to determining that the autonomous vehicle is expected to encounter a specific event within a specific time period as a result of locating the autonomous vehicle, transmitting vehicle location data corresponding to the result of locating the autonomous vehicle, sensor location data corresponding to a location where the sensor is mounted on the autonomous vehicle, direction data corresponding to a travelling direction of the autonomous vehicle, vehicle structure data of the autonomous vehicle and viewing angle data of the sensor to the server, to thereby query the server to determine whether a region of interest corresponding to the specific event to be encountered on the specific road is included in blind spot candidates for the blind spot of the sensor; (b) the computing device receiving blind spot stereoscopic data from the server, wherein the blind spot stereoscopic data is computed by referring to the vehicle location data, the sensor location data, the direction data, the vehicle structure data, the viewing angle data and three-dimensional (3D) occlusion environmental data corresponding to at least one occluding static object included in the blind spot candidates; and (c) the computing device controlling movement of the autonomous vehicle by referring to the blind spot stereoscopic data so that the autonomous vehicle drives in the blind spot.

As one example, at the step of (a), in response to acquiring boundary surface information of the occluding static object by referring to the precision map information and determining that the boundary surface information satisfies a specific analysis-requiring condition, the computing device queries the server to determine whether the region of interest corresponding to the specific event is included in the blind spot candidates.

As one example, (i) in response to determining that the occluding static object is a roadway-related occluding object, the computing device classifies the roadway-related occluding object into either a first-type roadway-related occluding object that separates a lane in the travelling direction of the autonomous vehicle from a lane in a direction opposite to the travelling direction of the autonomous vehicle or a second-type roadway-related occluding object that separates the lane in the travelling direction of the autonomous vehicle from an adjacent non-roadway, and then (i-1) in response to identifying the roadway-related occluding object as the first-type roadway-related occluding object, the computing device determines that the specific analysis-requiring condition is not met and decides not to query the server, or (i-2) in response to identifying the roadway-related occluding object as the second-type roadway-related occluding object, the computing device determines the specific analysis-requiring condition as satisfied when the boundary surface information of the occluding static object satisfies a specific first condition, to thereby query the server, and (ii) in response to determining that the occluding static object is a non-roadway-related occluding object, the computing device determines the specific analysis-requiring condition as satisfied when the boundary surface information of the occluding static object satisfies a specific second condition, to thereby query the server.

As one example, (i) the first-type roadway-related occluding object includes central separating structures that prevent collisions between vehicles travelling in opposite directions from each other, (ii) the second-type roadway-related occluding object includes at least some of safety signs, artificial structures and road curbs that separate roadways and non-roadways, and (iii) the non-roadway-related occluding object includes at least some of buildings, utility poles and trees.

As one example, the computing device acquires a two-dimensional vector, representing a location and a direction of the occluding static object in a plan view, as the boundary surface information of the occluding static object by referring to the precision map information, and the computing device instructs the server to acquire a three-dimensional vector, representing a location and a direction of the occluding static object in a three-dimensional space, as the boundary surface information of the occluding static object by referring to three-dimensional precision map information, and thus receives the three-dimensional vector from the server.

As one example, at the step of (b), the computing device acquires the blind spot stereoscopic data, including data on a horizontal-direction occluding region and data on a vertical-direction occluding region, from the server.

As one example, the computing device defines blind spot determining processes into a horizontal-direction blind spot determining process and a vertical-direction blind spot determining process, wherein (i) the horizontal-direction blind spot determining process determines the blind spot based on a horizontal plane comprised of an x-axis and a y-axis from the sensor installed on a certain location of the autonomous vehicle while a positive direction of the x-axis is assumed to be the travelling direction of the autonomous vehicle and a positive direction of the y-axis is assumed to be a left direction from the autonomous vehicle, and (ii) the vertical-direction blind spot determining process determines the blind spot based on a vertical plane comprised of the x-axis and a z-axis from the sensor installed on the certain location of the autonomous vehicle while the positive direction of the x-axis is assumed to be the travelling direction of the autonomous vehicle and a positive direction of the z-axis is assumed to be a direction vertically upwards from the autonomous vehicle, and the computing device instructs the server to perform, as the horizontal-direction blind spot determining process, sub-processes of (i) acquiring coordinates of the sensor installed on the certain location, (ii) detecting a plurality of occlusion-related points, included within a horizontal-direction viewing angle of the sensor, among a plurality of points on boundary lines of a horizontal cross-section of the occluding static object included in the three-dimensional occluding environmental data and selecting a first linear line and a second linear line from a plurality of linear lines connecting the coordinates of the sensor to the plurality of occlusion-related points, wherein an angle between the first linear line and the second linear line is the biggest among angles between any two different linear lines selected from the plurality of linear lines and wherein the second linear line forms a smaller angle with the x-axis than the first linear line with the x-axis, (iii) defining an intersection between the first linear line and a boundary line of a side of the horizontal cross-section facing the autonomous vehicle and an intersection between the second linear line and the boundary line of the side of the horizontal cross-section facing the autonomous vehicle respectively as a first point and a second point, defining the first linear line and the second linear line respectively as $A_1X-Y+B_1=0$ and $A_2X-Y+B_2=0$, and defining a third linear line connecting the first point and the second point as $A_3X-Y+B_3=0$, and (iv) determining whether the region of interest corresponding to the specific event is included in the horizontal-direction occluding region simultaneously satisfying inequations, $A_1X-Y+B_1<0$, $A_2X-Y+B_2>0$, $A_3X-Y+B_3>0$, of the first linear line to the third linear line, and then the computing device receives a result thereof from the server, and the computing device instructs the server to perform, as the vertical-direction blind spot determining process, sub-processes of (i) acquiring the coordinates of the sensor installed on the certain location, (ii) detecting a plurality of occlusion-related points, included within a vertical-direction viewing angle of the sensor, among a plurality of points on boundary lines of a vertical cross-section of the occluding static object included in the three-dimensional occluding environmental data and selecting a fourth linear line and a fifth linear line from a plurality of linear lines connecting the coordinates of the sensor to the plurality of occlusion-related points, wherein an angle between the fourth linear line and the fifth linear line is the biggest among angles between any two different linear lines selected from the plurality of linear lines, (iii) defining an intersection between the fourth linear line and a boundary line of a side of the vertical cross-section facing the autonomous vehicle and an intersection between the fifth linear line and the boundary line of the side of the vertical cross-section facing the autonomous vehicle respectively as a fourth point and a fifth point wherein the fifth point is located closer to a ground than the fourth point to the ground, defining the fourth linear line and the fifth linear line respectively as $C_1X-Z+D_1=0$ and $C_2X-Z+D_2=0$, and defining a sixth linear line connecting the fourth point and the fifth point as $C_3X-Z+D_3=0$, and (iv) determining whether the region of interest corresponding to the specific event is included in the vertical-direction occluding region not surrounded by the fourth linear line, the fifth linear line and the sixth linear line, and then the computing device receives a result thereof from the server.

As one example, at the step of (c), in response to determining that the region of interest corresponding to the specific event is included in the blind spot by referring to the blind spot stereoscopic data received from the server, the computing device assumes that a virtual moving object exists within the blind sport, and controls a speed of the autonomous vehicle by referring to a first estimated time to be taken for the autonomous vehicle to encounter the specific event and a second estimated time to be taken for the virtual moving object to encounter the specific event.

As one example, (i) (i–1) time taken for the autonomous vehicle travelling with an initial speed of $v_0$ and a predetermined deceleration of a1 to encounter the specific event is defined as a (1_1)-st estimated time, and time taken for the autonomous vehicle travelling with an adjusted speed of $v_1$ and the predetermined deceleration of a1 to stop is defined as a (1_2)-nd estimated time, and (i–2) a (1_1)-st estimated distance corresponding to the (1_1) st estimated time is defined as a distance dstop left by the autonomous vehicle driving with the initial speed $v_0$ to encounter the specific event, and a (1_2)-nd estimated distance corresponding to the (1_2) nd estimated time is defined as a distance $d_{target}$ to a target stopping point left by the autonomous vehicle driving with the adjusted speed $v_1$, and (ii) when the distance dstop is longer than the distance dtarget, the adjusted speed $v_1$ is set as a safety speed vsafe, thereby controlling the speed of the autonomous vehicle by decreasing the speed of the autonomous vehicle to a target speed.

In accordance with another aspect of the present disclosure, there is provided a computing device for driving in a blind spot of a sensor, mounted on an autonomous vehicle running on a specific road, via communication with a server, including: at least one memory that stores instructions; and at least one processor configured to execute the instructions to perform or support another device to perform: (I) (i) a process of locating the autonomous vehicle by using at least one of precision map information, sensor information and GPS (Global Positioning System) information, and (ii) in response to determining that the autonomous vehicle is expected to encounter a specific event within a specific time period as a result of locating the autonomous vehicle, a process of transmitting vehicle location data corresponding to the result of locating the autonomous vehicle, sensor location data corresponding to a location where the sensor is mounted on the autonomous vehicle, direction data corresponding to a travelling direction of the autonomous vehicle, vehicle structure data of the autonomous vehicle and viewing angle data of the sensor to the server, to thereby query the server to determine whether a region of interest corresponding to the specific event to be encountered on the specific road is included in blind spot candidates for the blind spot of the sensor, (II) a process of receiving blind spot stereoscopic data from the server, wherein the blind spot stereoscopic data is computed by referring to the vehicle location data, the sensor location data, the direction data, the vehicle structure data, the viewing angle data and three-dimensional (3D) occlusion environmental data corresponding to at least one occluding static object included in the blind spot candidates, and (III) a process of controlling movement of the autonomous vehicle by referring to the blind spot stereoscopic data so that the autonomous vehicle drives in the blind spot.

As one example, at the processes of (I), in response to acquiring boundary surface information of the occluding static object by referring to the precision map information and determining that the boundary surface information satisfies a specific analysis-requiring condition, the processor queries the server to determine whether the region of interest corresponding to the specific event is included in the blind spot candidates.

As one example, (i) in response to determining that the occluding static object is a roadway-related occluding object, the processor classifies the roadway-related occluding object into either a first-type roadway-related occluding object that separates a lane in the travelling direction of the autonomous vehicle from a lane in a direction opposite to the travelling direction of the autonomous vehicle or a second-type roadway-related occluding object that separates the lane in the travelling direction of the autonomous vehicle from an adjacent non-roadway, and then (i-1) in response to identifying the roadway-related occluding object as the first-type roadway-related occluding object, the processor determines that the specific analysis-requiring condition is not met and decides not to query the server, or (i-2) in response to identifying the roadway-related occluding object as the second-type roadway-related occluding object, the processor determines the specific analysis-requiring condition as satisfied when the boundary surface information of the occluding static object satisfies a specific first condition, to thereby query the server, and (ii) in response to determining that the occluding static object is a non-roadway-related occluding object, the processor determines the specific analysis-requiring condition as satisfied when the boundary surface information of the occluding static object satisfies a specific second condition, to thereby query the server.

As one example, (i) the first-type roadway-related occluding object includes central separating structures that prevent collisions between vehicles travelling in opposite directions from each other, (ii) the second-type roadway-related occluding object includes at least some of safety signs, artificial structures and road curbs that separate roadways and non-roadways, and (iii) the non-roadway-related occluding object includes at least some of buildings, utility poles and trees.

As one example, the processor acquires a two-dimensional vector, representing a location and a direction of the occluding static object in a plan view, as the boundary surface information of the occluding static object by referring to the precision map information, and the processor instructs the server to acquire a three-dimensional vector, representing a location and a direction of the occluding static object in a three-dimensional space, as the boundary surface information of the occluding static object by referring to three-dimensional precision map information, and thus receives the three-dimensional vector from the server.

As one example, at the process of (II), the processor acquires the blind spot stereoscopic data, including data on a horizontal-direction occluding region and data on a vertical-direction occluding region, from the server.

As one example, the processor defines blind spot determining processes into a horizontal-direction blind spot determining process and a vertical-direction blind spot determining process, wherein (i) the horizontal-direction blind spot determining process determines the blind spot based on a horizontal plane comprised of an x-axis and a y-axis from the sensor installed on a certain location of the autonomous vehicle while a positive direction of the x-axis is assumed to be the travelling direction of the autonomous vehicle and a positive direction of the y-axis is assumed to be a left direction from the autonomous vehicle, and (ii) the vertical-direction blind spot determining process determines the blind spot based on a vertical plane comprised of the x-axis and a z-axis from the sensor installed on the certain location of the autonomous vehicle while the positive direction of the x-axis is assumed to be the travelling direction of the autonomous vehicle and a positive direction of the z-axis is assumed to be a direction vertically upwards from the autonomous vehicle, and the processor instructs the server to perform, as the horizontal-direction blind spot determining process, sub-processes of (i) acquiring coordinates of the sensor installed on the certain location, (ii) detecting a plurality of occlusion-related points, included within a horizontal-direction viewing angle of the sensor, among a plurality of points on boundary lines of a horizontal cross-section of the occluding static object included in the three-dimensional occluding environmental data and selecting a first linear line and a second linear line from a plurality of linear lines connecting the coordinates of the sensor to the plurality of occlusion-related points, wherein an angle between the first linear line and the second linear line is the biggest among angles between any two different linear lines selected from the plurality of linear lines and wherein the second linear line forms a smaller angle with the x-axis than the first linear line with the x-axis, (iii) defining an intersection between the first linear line and a boundary line of a side of the horizontal cross-section facing the autonomous vehicle and an intersection between the second linear line and the boundary line of the side of the horizontal cross-section facing the autonomous vehicle respectively as a first point and a second point, defining the first linear line and the second linear line respectively as A1X−Y+B1=0 and A2X−Y+B2=0, and defining a third linear line connecting the first point and the second point as A3X−Y+B3=0, and (iv) determining whether the region of interest corresponding to the specific event is included in the horizontal-direction occluding region simultaneously satisfying inequations, A1X−Y+B1<0, A2X−Y+B2>0, A3X−Y+B3>0, of the first linear line to the third linear line, and then the processor receives a result thereof from the server, and the processor instructs the server to perform, as the vertical-direction blind spot determining process, sub-processes of (i) acquiring the coordinates of the sensor installed on the certain location, (ii) detecting a plurality of occlusion-related points, included within a vertical-direction viewing angle of the sensor, among a plurality of points on boundary lines of a vertical cross-section of the occluding static object included in the three-dimensional occluding environmental data and selecting a fourth linear line and a fifth linear line from a plurality of linear lines connecting the coordinates of the sensor to the plurality of occlusion-related points, wherein an angle between the fourth linear line and the fifth linear line is the biggest among angles between any two different linear lines selected from the plurality of linear lines, (iii) defining an intersection between the fourth linear line and a boundary line of a side of the vertical cross-section facing the autonomous vehicle and an intersection between the fifth linear line and the boundary line of the side of the vertical cross-section facing the autonomous vehicle respectively as a fourth point and a fifth point wherein the fifth point is located closer to a ground than the fourth point to the ground, defining the fourth linear line and the fifth linear line respectively as $C_1X−Z+D_1=0$ and C2X−Z+D2=0, and defining a sixth linear line connecting the fourth point and the fifth point as C3X−Z+D3=0, and (iv) determining whether the region of interest corresponding to the specific event is included in the vertical-direction occluding region not surrounded by the fourth linear line, the fifth linear line and the sixth linear line, and then the processor receives a result thereof from the server.

As one example, at the process of (III), in response to determining that the region of interest corresponding to the specific event is included in the blind spot by referring to the blind spot stereoscopic data received from the server, the processor assumes that a virtual moving object exists within the blind sport, and controls a speed of the autonomous vehicle by referring to a first estimated time to be taken for the autonomous vehicle to encounter the specific event and a second estimated time to be taken for the virtual moving object to encounter the specific event.

As one example, (i) (i−1) time taken for the autonomous vehicle travelling with an initial speed of $v_0$ and a predetermined deceleration of a1 to encounter the specific event is defined as a (1_1)-st estimated time, and time taken for the autonomous vehicle travelling with an adjusted speed of $v_1$ and the predetermined deceleration of a1 to stop is defined as a (1_2)-nd estimated time, and (i−2) a (1_1)-st estimated distance corresponding to the (1_1) st estimated time is defined as a distance dstop left by the autonomous vehicle driving with the initial speed $v_0$ to encounter the specific event, and a (1_2)-nd estimated distance corresponding to the (1_2) nd estimated time is defined as a distance $d_{target}$ to a target stopping point left by the autonomous vehicle driving with the adjusted speed $v_1$, and (ii) when the distance dstop is longer than the distance dtarget, the adjusted speed $v_1$ is set as a safety speed vsafe, thereby controlling the speed of the autonomous vehicle by decreasing the speed of the autonomous vehicle to a target speed.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

FIG. 1 is a drawing schematically illustrating two cases with different results as to whether an area around a road can be perceived by an autonomous vehicle according to different installation locations of sensors and their corresponding viewing angles when some portions of their field of views (FOVs) are obstructed by structures present in the area around the road in accordance with one example embodiment of the present disclosure.

FIGS. 2A and 2B are drawings schematically illustrating two cases where there are different probabilities of the autonomous vehicle failing to perceive another vehicle according to difference between using accurate information on the structures around the road and using inaccurate information thereon due to inaccuracy of precision maps used by the autonomous vehicle in accordance with one example embodiment of the present disclosure.

FIG. 4 is a drawing schematically illustrating a flowchart on a method of driving in a blind spot of the sensor mounted on the autonomous vehicle via communication with the server in accordance with one example embodiment of the present disclosure.

DETAILED DESCRIPTION OF THE PREFERRED EMBODIMENTS

Figure 2B:
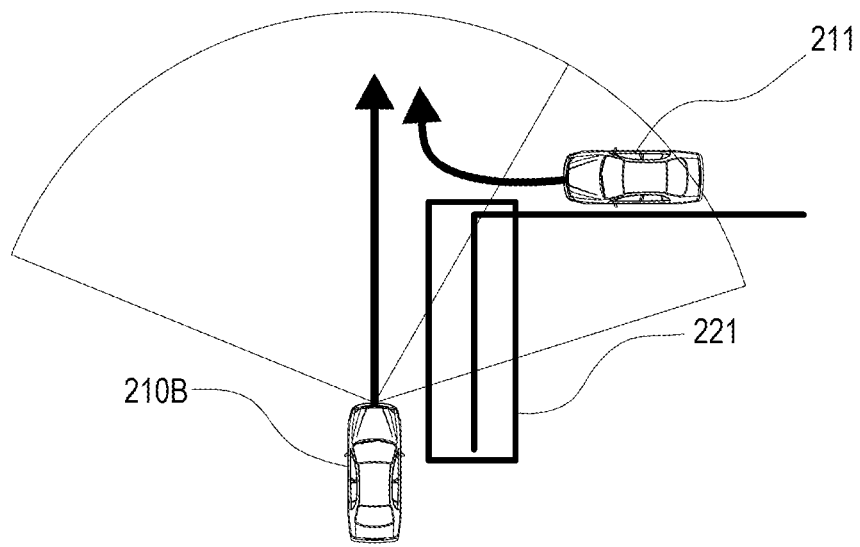

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

The headings and abstract of the present disclosure provided herein are for convenience only and do not limit or interpret the scope or meaning of the embodiments.

As used in this specification and the appended claims, the singular forms "a," "an," and "the" may include plural referents unless the content and context clearly dictates otherwise.

To allow those skilled in the art to carry out the present disclosure easily, the example embodiments of the present disclosure will be explained by referring to attached diagrams in detail as shown below.

Vehicles are mainly discussed in the present disclosure, but the present disclosure is not limited thereto and may be generally applied to all types of moving body. For example, in addition to the vehicles, the present disclosure may also applicable to all means of transportation that travel on roads, such as a motorbike.

FIG. 1 is a drawing schematically illustrating tow cases with different results as to whether an area around a road can be perceived by an autonomous vehicle according to different installation locations of sensors and their corresponding viewing angles when some portions of their field of views (FoVs) are obstructed by structures present in the area around the road in accordance with one example embodiment of the present disclosure.

The sensors mounted on autonomous vehicles must perform appropriate recognition of other objects present in their surroundings by recognizing crosswalks, road intersections and joining areas, etc., to avoid collisions with said other objects. However, it cannot be guaranteed that all the autonomous vehicles are able to accurately recognize and respond to blind spots of the sensors without failures since a type, a performance and an installation location of the sensors are all different for each autonomous vehicle. Also, having varying the types, the performance and the installation locations of the sensors means that ranges of the blind spots are different for each autonomous vehicle and competency to respond to the blind spots also vary.

By referring to FIG. 1, a blind spot may be generated due to a fence standing at a side of a road. Accordingly, FIG. 1 is illustratively showing an area recognizable by the sensor mounted on the autonomous vehicle and an area unrecognizable by the sensor. When the sensor is mounted on a front lower part of the autonomous vehicle as shown in an upper center of FIG. 1, an area where the road is located is recognized without any problem, but some part of an area beyond the side of the road is not recognizable due to the fence present. On the other hand, when the sensor is mounted on the top of a roof of the autonomous vehicle as shown in a lower center of FIG. 1, both the area where the road is located and the area beyond the side of the road are recognized without problems. Thus, it can be seen that even if the sensor of the same type and specifications is used, the blind spot not perceived by the sensor may exist depending on a position at which the sensor is mounted and consequently occasions where the autonomous vehicle fails to recognize other vehicles joining the same lane or a pedestrian entering the road to cross a crosswalk may occur.

FIGS. 2A and 2B are drawings schematically illustrating two cases where there are different probabilities of the autonomous vehicle failing to perceive another vehicle according to difference between using accurate information on the structures around the road and using inaccurate information thereon due to inaccuracy of precision maps used by the autonomous vehicle in accordance with one example embodiment of the present disclosure.

By referring to FIG. 2A, when a height of a structure 222 stored in a precision map, directly referred to by an autonomous vehicle 210A driving straight in a road, matches with a height of an actual road-way structure 221 as depicted in a top of FIG. 2A, a computing device 100 of the autonomous vehicle is able to accurately recognize a blind spot caused by the actual road-way structure 221. However, there may be another case where a height of a structure 223 stored in the precision map, directly referred to by an autonomous vehicle 210B driving straight in the road, is not the same as the height of the actual road-way structure 221, as shown in a bottom of FIG. 2B. When the height of the structure 223 stored in the precision map is lower than the height of the actual road-way structure 221, the computing device 100 may not be able to accurately recognize the blind spot.

FIG. 2B is exemplarily showing a case in which the autonomous vehicle 210B going straight in a lane fails to perceive another vehicle 211 joining the lane due to the actual road-way structure 221 present near the road. Herein, even for the case where the height of the structure, corresponding to the actual road-way structure 221 present near the road, stored in the precision map is lower than the actual height of the actual road-way structure 221 present near the road and is thus decided based on the precision map that a blind spot is not caused by the structure 221, there may actually be the blind spot caused by the structure 221 but the autonomous vehicle 210B may fail to recognize the vehicle 211 joining the lane. Problems such as this may frequently occur because the levels of precision for the precision maps used are different for each different autonomous vehicle and there is a limit to which every structure is accurately depicted on the precision maps when complexities of the precision maps increase due to increased complexities of structures present around the road. Contrary to the limitation of the autonomous vehicle, a server, operated centrally or operated externally, is able to take advantage of a high-performance PC and is not restricted by electricity usage, and thus is competent enough to utilize ultra-precision maps.

Figure 3:
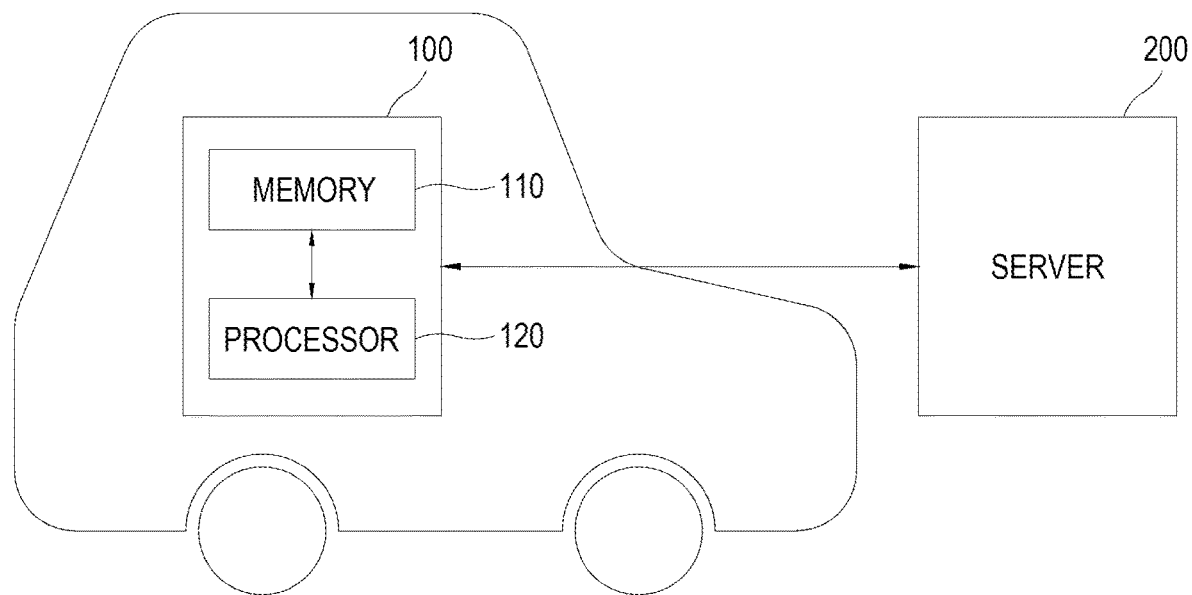
FIG. 3 is a drawing schematically illustrating an interaction between a computing device of the autonomous vehicle and a server in accordance with one example embodiment of the present disclosure.

Next, FIG. 3 is a drawing schematically illustrating an interaction between the computing device of the autonomous vehicle and the server in accordance with one example embodiment of the present disclosure.

By referring to FIG. 3, the computing device 100 of the present disclosure may include a memory 110 and a processor 120.

By referring to FIG. 3, the computing device 100 may include a memory 110 for storing instructions to drive in the blind spot of the autonomous vehicle via communication with the server 200, and a processor 120 for controlling the autonomous vehicle to drive in the blind spot according to the instructions in the memory 110. Herein, the computing device 100 may include computing devices such as a sever, a personal computer (PC), a tablet, a mobile computer, a PDA/EDA, a mobile phone, a smart phone, an IoT device, and the like.

Specifically, the computing device 100 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

Meanwhile, the computing device 100 may be comprised of multiple devices that perform various functions.

FIG. 4 is a drawing schematically illustrating a flowchart on a method of driving in the blind spot of the sensor mounted on the autonomous vehicle via communication with the server in accordance with one example embodiment of the present disclosure.

By referring to FIG. 4, the computing device 100 of the autonomous vehicle running on a specific road may locate the autonomous vehicle by using at least one of precision map information, sensor information and GPS (Global Positioning System) information. Then, in response to determining, as a result of locating the autonomous vehicle, that the autonomous vehicle is expected to encounter a specific event within a specific time period, the computing device 100 may transmit vehicle location data corresponding to the result of locating the autonomous vehicle, sensor location data corresponding to a location where the sensor is mounted on the autonomous vehicle, direction data corresponding to a travelling direction of the autonomous vehicle, vehicle structure data of the autonomous vehicle and viewing angle data of the sensor to the server 200, to thereby query the server 200 to determine whether a region of interest corresponding to the specific event to be encountered on the specific road is included in blind spot candidates for the blind spot of the sensor at a step of S410.

Afterwards, the computing device 100 may receive blind spot stereoscopic data from the server 200 at a step of S420, wherein the blind spot stereoscopic data is computed by referring to the vehicle location data, the sensor location data, the direction data, the vehicle structure data, the viewing angle data and three-dimensional (3D) occlusion environmental data (i.e., data of an ultra-precision map) corresponding to at least one occluding static object included in the blind spot candidates.

Following, the computing device 100 may control movement of the autonomous vehicle by referring to the blind spot stereoscopic data at a step of S430 so that the autonomous vehicle drives in the blind spot.

In order to describe the flowchart of FIG. 4 in further detail, the following description is provided by referring to FIG. 5 to FIG. 9B.

Figure 5:
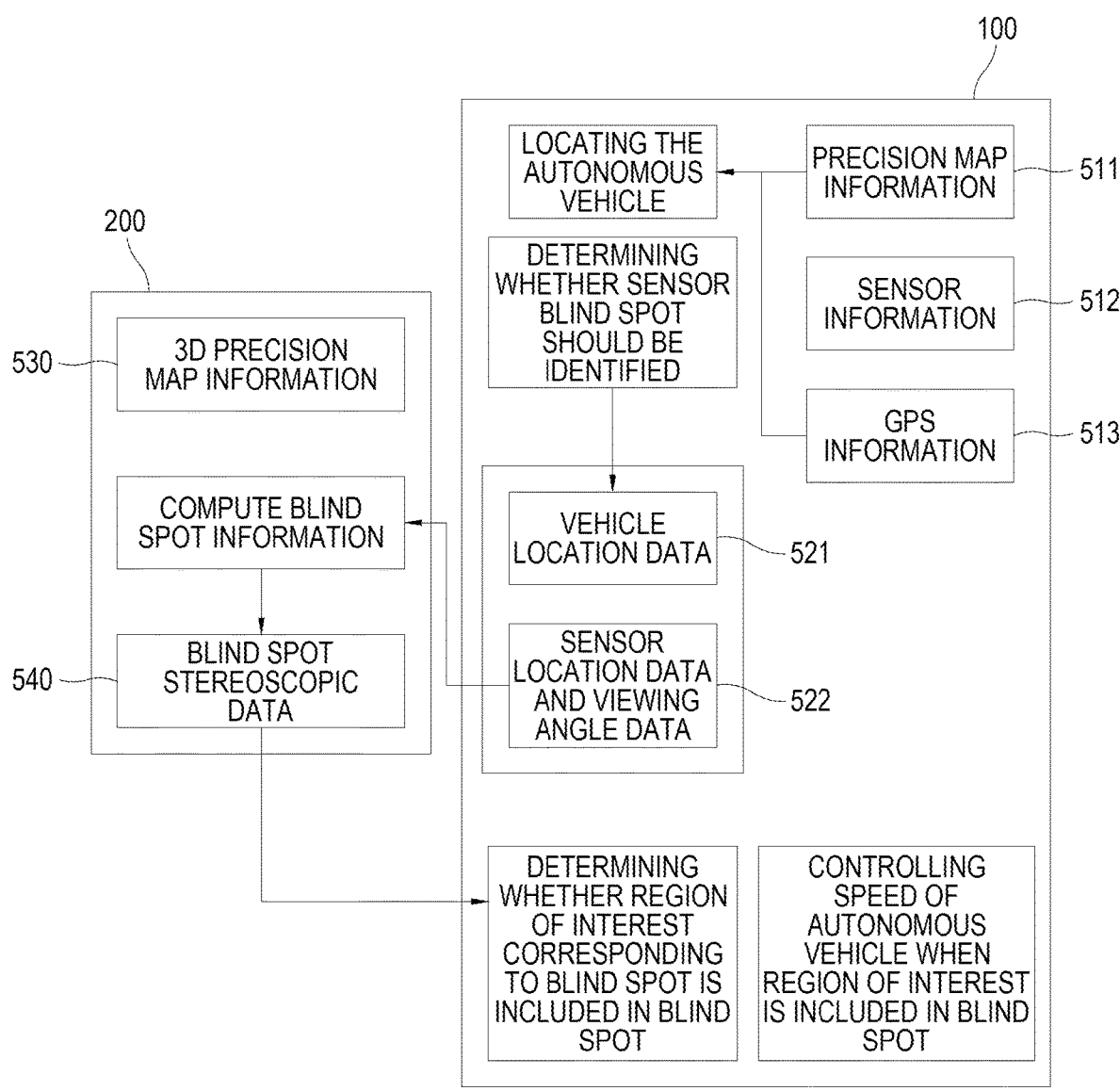
FIG. 5 is a drawing schematically illustrating the interaction between the computing device of the autonomous vehicle and the server in accordance with one example embodiment of the present disclosure.

FIG. 5 is a drawing illustrating the interaction between the computing device 100 of the autonomous vehicle and the server 200 in more detail in accordance with one example embodiment of the present disclosure.

First, the computing device 100 may locate the autonomous vehicle by using at least one of the precision map information 511, the sensor information 512 and the GPS information 513, and as a result of locating the autonomous vehicle, the computing device 100 may determine that the autonomous vehicle is expected to encounter the specific event (for example, a crosswalk area, a road intersection, a lane joining area, etc.) within the specific time period. Herein, the sensor information 512 may include information on a surrounding of a location of the moving autonomous vehicle acquired from the sensor mounted on the autonomous vehicle, and using such information may compensate for possible inaccuracy of the GPS information 513. On the other hand, the precision map information 511 may include information on a driving route for each lane and boundary surfaces of structures around the road. The driving route for each lane may be indicated in a form of polyline and in a series of coordinates expressed in a specific coordinate system, such as UTM coordinate system. Herein, each of the structures around the road may be recognized as either a roadway-related occluding object or a non-roadway-related occluding object. Herein, the precision map information 511 may include two-dimensional data and may also occasionally include some three-dimensional data, but the three-dimensional data are often not treated as accurate data in terms of their numerical values, etc.

The roadway-related occluding object may be classified into either a first-type roadway-related occluding object or a second-type roadway-related occluding object.

The first-type roadway-related occluding object corresponds to occluding static objects located on the opposite side of the road, i.e., the opposite side of the road in the travelling direction of the autonomous vehicle, and since there is no need to analyze the occluding static object located on the opposite side of the road in principle, an analysis-requiring condition (i.e., a possibility that the blind spot caused by the occluding static object would hinder maneuvering of the autonomous vehicle) would not be satisfied, and thus it is not required to query the server 200. For example, the first-type roadway-related occluding object may include central separating structures that prevent collisions between vehicles travelling in opposite directions from each other, or buildings located on the side of the opposite side of the road.

The second-type roadway-related occluding object, on the other hand, may satisfy the analysis-requiring condition in some cases, thereby making it necessary to query the server 200. For example, the second-type roadway-related occluding object may be road-assisting structures installed for the safety and convenience of vehicles and pedestrians on the road. Herein, the road-assisting structures may include at least some of safety signs, artificial structures and road curbs that separate roadways and non-roadways.

In order to determine whether the second-type roadway-related occluding object satisfies the analysis-requiring condition, the computing device 100 may detect boundary surfaces of the road-assisting structures by using camera(s) installed on the autonomous vehicle, and when boundary surface information of the road-assisting structures satisfies a first condition, the computing device 100 may determine the analysis-requiring condition as satisfied and thus query the server 200. For example, the boundary surface information may contain information on at least one of a vertical length and a horizontal length of the occluding static object when viewed from the autonomous vehicle, i.e., the sensor, in motion, and the first condition is determined to be satisfied when at least one of the vertical length and the horizontal length exceeds length thresholds or an apparent area formed by the vertical length and the horizontal length exceeds an area threshold.

However, exceptionally, when any one of the horizontal length and the vertical length far exceeds its corresponding upper threshold and the other remaining length is below its corresponding lower threshold, it is unlikely that the occluding static object having said horizontal length and vertical length obstructs the view of the autonomous vehicle, and thus the occluding static object is considered not to satisfy the first condition and its corresponding query may not be sent to the server 200.

Next, similar to the second-type roadway-related occluding object, the non-roadway-related occluding object may satisfy the analysis-requiring condition in some cases, thereby making it necessary to query the server 200. For example, the non-roadway-related occluding object may include structures that constitute areas other than the road, and may refer to at least some buildings, utility poles, trees and the like.

In order to determine whether the non-roadway-related occluding object satisfies the analysis-requiring condition, the computing device 100 may detect boundary surfaces of the non-roadway-related occluding object by using the camera(s) installed on the autonomous vehicle, and when boundary surface information of the non-roadway-related occluding object satisfies a second condition, the computing device 100 may determine the analysis-requiring condition as satisfied and thus query the server 200. For example, the boundary surface information may contain information on at least one of a vertical length and a horizontal length of the non-roadway-related occluding object when viewed from the autonomous vehicle in motion, and the second condition is determined to be satisfied when at least one of the vertical length and the horizontal length exceeds length thresholds or an apparent area formed by the vertical length and the horizontal length exceeds an area threshold.

However, exceptionally, when any one of the horizontal length and the vertical length far exceeds its corresponding upper threshold and the other remaining length is below its corresponding lower threshold, it is unlikely that the non-roadway-related occluding object having said horizontal length and vertical length obstructs the view of the autonomous vehicle, and thus the occluding static object is considered not to satisfy the second condition and its corresponding query may not be sent to the server 200.

By referring to FIG. 5 again, when the analysis-requiring condition is satisfied, the computing device 100 may transmit the vehicle location data 521 of the autonomous vehicle and the sensor location data and the viewing angle data 522 of the sensor to the server 200, and although it is not shown, the direction data corresponding to the travelling direction of the autonomous vehicle may also be transmitted to the server 200.

The server 200 may compute blind spot information by using three-dimensional (3D) precision map information 530 and information received from the computing device 100 of the autonomous vehicle. Through this, the server 200 may acquire the blind spot stereoscopic data including data on a horizontal-direction occluding region and data on a vertical-direction occluding region and transmit thereof to the computing device 100 of the autonomous vehicle. Herein, the 3D precision map information 530 may be an ultra-precision map used by the server 200 and may be real-time 3D data reflecting accuracy, unlike the precision map information 511 which may only partially contain 3D data.

Following, the computing device 100 may determine whether the region of interest corresponding to the specific event to be encountered on the specific road is included in the blind spot by referring to the blind spot stereoscopic data received from the server 200, and in case the region of interest is determined as included in the blind spot, the autonomous vehicle may be controlled by decreasing its speed.

Figure 6A:
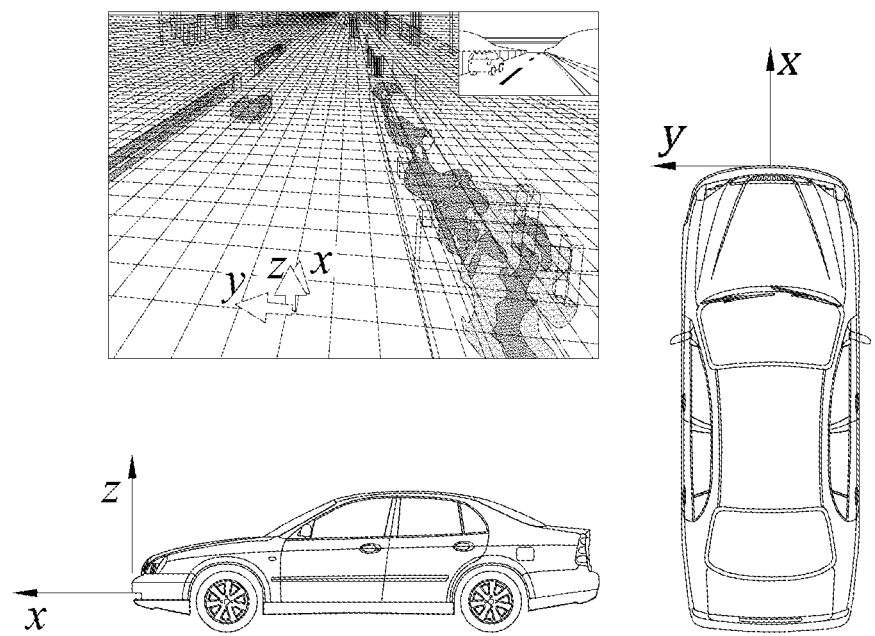
FIGS. 6A to 6C are drawings schematically illustrating examples of information on installation locations of the sensors for the autonomous vehicle in accordance with one example embodiment of the present disclosure.
Figure 6B:
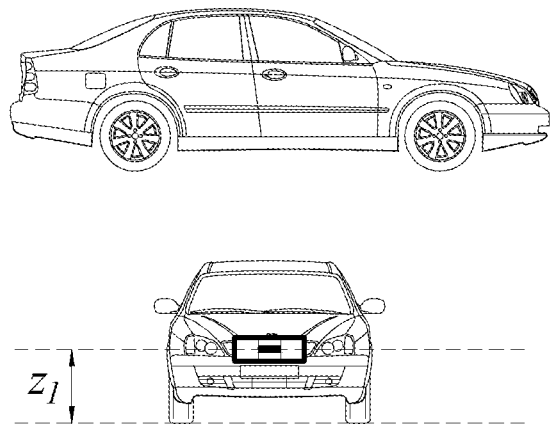
Figure 6C:
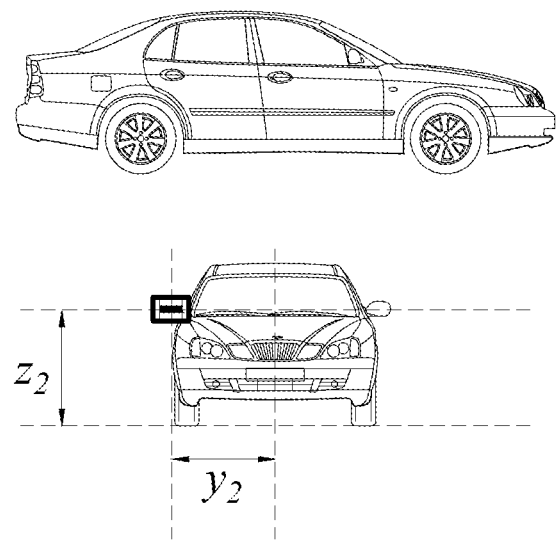

FIGS. 6A to 6C are drawings schematically illustrating examples of information on installation locations of the sensors for the autonomous vehicle in accordance with one example embodiment of the present disclosure.

First, by referring to FIG. 6A, a coordinate system of the sensor may set ground below a center of a bumper of the autonomous vehicle as its origin, the travelling direction of the autonomous vehicle as a positive direction of an x-axis, a left direction from the autonomous vehicle as a positive direction of a y-axis, and a direction vertically upwards from the autonomous vehicle as a positive direction of a z-axis.

Next, by referring to FIG. 6B, when the sensor is mounted on the center of the bumper of the autonomous vehicle, the x-coordinate and the y-coordinate of the sensor are 0 and the z-coordinate may be set as a height $z_1$ from the ground to the center of the bumper of the autonomous vehicle. However, the present disclosure is not limited thereto, and it is also possible to set the z-coordinate of the sensor installed at the height of $z_1$ as 0.

Also, by referring to FIG. 6C, when the sensor is mounted on a side mirror of the autonomous vehicle, an installation location of the sensor in the direction of the x-axis may correspond to a distance $x_2$ from the front of the autonomous vehicle to the side mirror along the longitudinal direction of the autonomous vehicle, a mounting direction of the sensor in the direction of the y-axis may correspond to a distance $y_2$ from the center of the bumper to the side mirror along the width direction of the autonomous vehicle, and an installation location of the sensor in the direction of the z-axis may correspond to a distance z 2 from the ground to the side mirror along the height direction of the autonomous vehicle. However, the present disclosure is not limited thereto, and it is also possible to set the x-coordinate, the y-coordinate and the z-coordinate of the sensor to be 0.

Figure 7A:
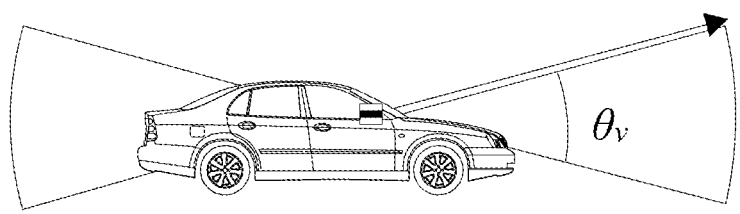
FIGS. 7A and 7B are drawings schematically illustrating examples of viewing angles of the sensors of the autonomous vehicle in accordance with one example embodiment of the present disclosure.
Figure 7B:
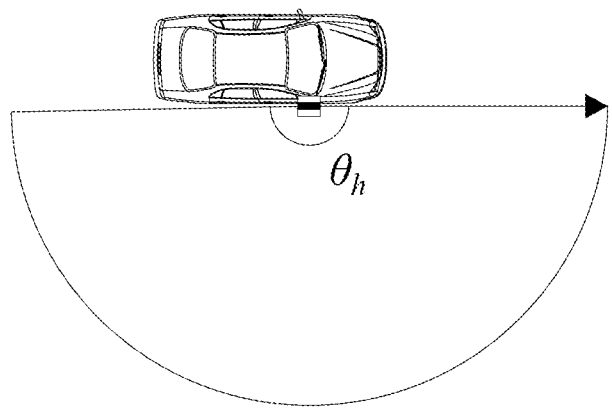

FIGS. 7A and 7B are drawings schematically illustrating examples of viewing angles of the sensors of the autonomous vehicle in accordance with one example embodiment of the present disclosure.

The viewing angle of the sensor mounted on the autonomous vehicle may refer to a range of view recognizable by the sensor and may be classified into a vertical direction and a horizontal direction. By referring to FIG. 7A, a vertical-direction viewing angle may correspond to a maximum recognizable viewing angle $\theta_v$ in the vertical direction. Next, by referring to FIG. 7B, a horizontal-direction viewing angle may correspond to a maximum recognizable viewing angle $\theta_h$ in the horizontal direction. Since maximum viewing ranges of the vertical-direction viewing angle and the horizontal-direction viewing angle may vary depending on the installation location of the sensor, said maximum viewing ranges may not be limited to the example embodiment of the present disclosure and various modifications may be possible.

Figure 8A:
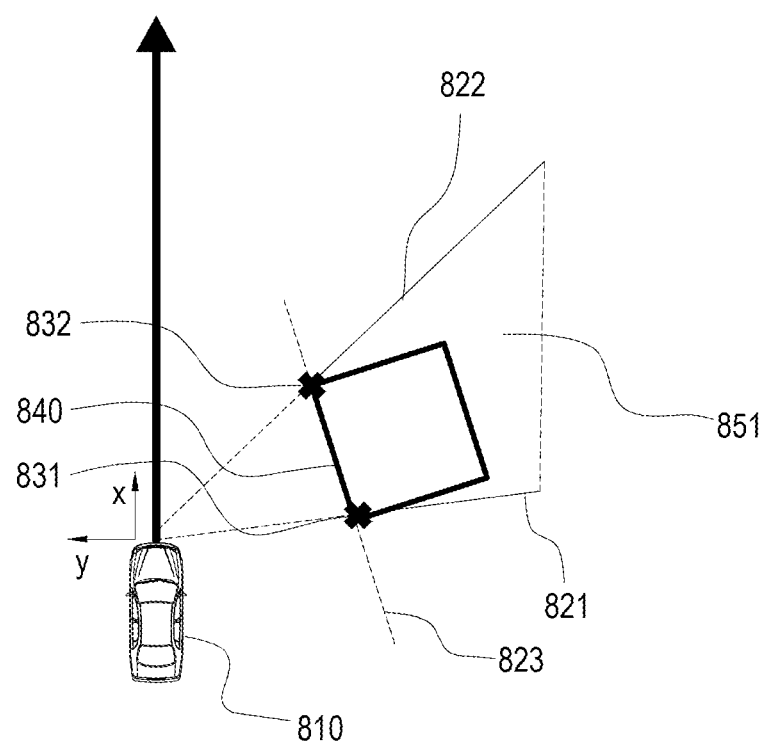
FIGS. 8A and 8B are drawings schematically illustrating examples of computing blind spot information by respectively analyzing a horizontal-direction occluding region and a vertical-direction occluding region through the server in accordance with one example embodiment of the present disclosure.
Figure 8B:
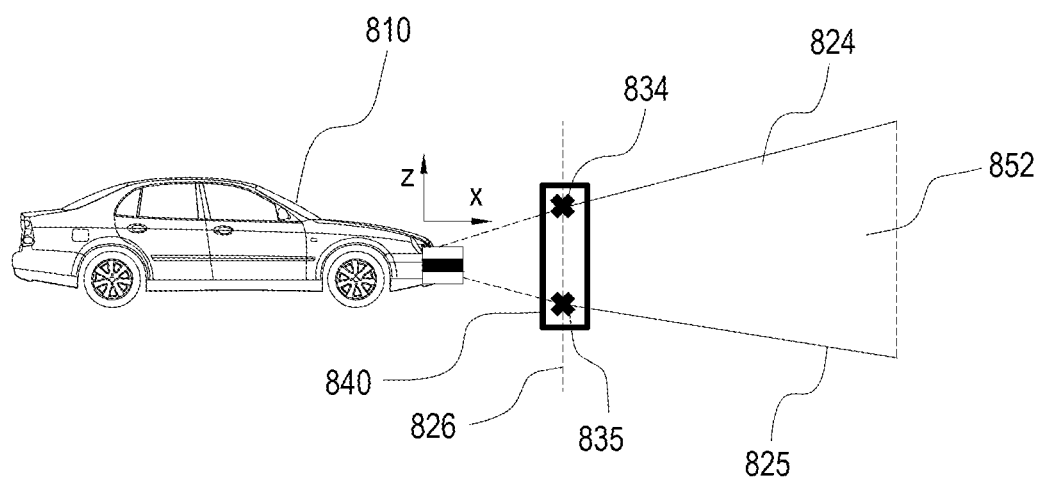

FIGS. 8A and 8B are drawings schematically illustrating examples of computing the blind spot information by respectively analyzing the horizontal-direction occluding region 851 and the vertical-direction occluding region 852 through the server 200 in accordance with one example embodiment of the present disclosure.

First, when the server 200 is queried to determine whether the region of interest corresponding to the specific event to be encountered on the specific road where the autonomous vehicle 810 is driving corresponds to the blind spot candidates, the server 200 may acquire the vehicle location data corresponding to the result of locating the autonomous vehicle 810, the sensor location data corresponding to the location where the sensor is mounted on the autonomous vehicle 810, the direction data corresponding to the travelling direction of the autonomous vehicle 810, the vehicle structure data of the autonomous vehicle 810 and viewing angle data of the sensor, from the autonomous vehicle 810 (i.e., the computing device 100).

Afterwards, in order to respond to the query, the server 200 may acquire the blind spot stereoscopic data on the basis of the data received from the autonomous vehicle 810 and the 3D occlusion environmental data (i.e., the ultra-precision map). Further, in order to compute said blind spot stereoscopic data, each of the horizontal-direction occluding region and the vertical-direction occluding region may be determined separately.

In detail, by referring to FIG. 8A, when there are a plurality of occlusion-related points, included within the horizontal-direction viewing angle of the sensor, among a plurality of points on boundary lines of a horizontal cross-section of the occluding static object included in the three-dimensional occluding environmental data 840, a first linear line 821 and a second linear line 822 may be selected among a plurality of linear lines connecting the coordinates of the sensor to the plurality of occlusion-related points, wherein an angle between the first linear line 821 and the second linear line 822 is the biggest among angles between any two different linear lines selected from the plurality of linear lines and wherein the second linear line forms a smaller angle with the x-axis than the first linear line with the x-axis. Then, an intersection between the first linear line 821 and a boundary line of a side of the horizontal cross-section facing the autonomous vehicle and an intersection between the second linear line 822 and the boundary line of the side of the horizontal cross-section facing the autonomous vehicle may be respectively defined as a first point 831 and a second point 832. Accordingly, the first linear line 821 and the second linear line 822 may be respectively defined as $A_1X-Y+B_1=0$ and $A_2X-Y+B_2=0$, and a third linear line 823 connecting the first point 831 and the second point 832 may be defined as $A_3X-Y+B_3=0$. As a result, the horizontal-direction occluding region 851 may be computed as a region simultaneously satisfying inequations, $A_1X-Y+B_1<0$, $A_2X-Y+B_2>0$, $A_3X-Y+B_3>0$, of the first linear line 821 to the third linear line 823.

Next, by referring to FIG. 8B, when there are a plurality of occlusion-related points, included within the vertical-direction viewing angle of the sensor, among a plurality of points on boundary lines of a vertical cross-section of the occluding static object included in the three-dimensional occluding environmental data 840, a fourth linear line 824 and a fifth linear line 825 may be selected among a plurality of linear lines connecting the coordinates of the sensor to the plurality of occlusion-related points, wherein an angle between the fourth linear line 824 and the fifth linear line 825 is the biggest among angles between any two different linear lines selected from the plurality of linear lines. Then, an intersection between the fourth linear line 824 and a boundary line of a side of the vertical cross-section facing the autonomous vehicle and an intersection between the fifth linear line 825 and the boundary line of the side of the vertical cross-section facing the autonomous vehicle may be respectively defined as a fourth point 834 and a fifth point 835, wherein the fifth point 835 is located closer to the ground than the fourth point 834 to the ground. Accordingly, the fourth linear line 824 and the fifth linear line 825 may be respectively defined as $C_1X-Z+D_1=0$ and $C_2X-Z+D_2=0$, and a sixth linear line 826 connecting the fourth point 834 and the fifth point 835 may be defined as $C_3X-Z+D_3=0$. As a result, the vertical-direction occluding region 852 may be computed as a region not surrounded by the fourth linear line 824, the fifth linear line 825 and the sixth linear line 826. Herein, as shown in FIG. 8B, the vertical occluding region 852 may be a region that is not surrounded by the fourth linear line 824, the fifth linear line 825 and the sixth linear line 826, among a region that satisfies inequations, $C_1X-Z+D1>0$ and $C_2X-Z+D_2<0$, of the fourth linear line 824 and the fifth linear line 825.

Figure 9A:
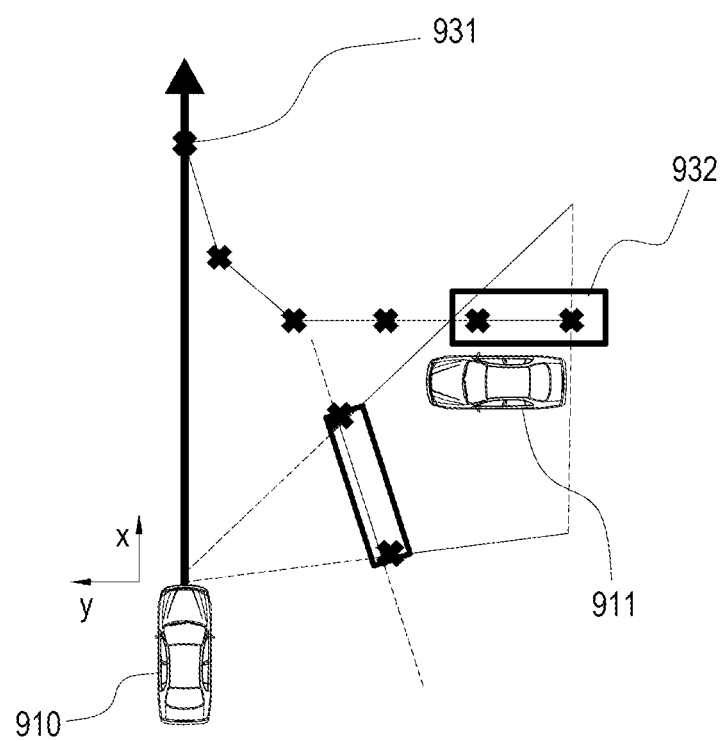
FIGS. 9A and 9B are drawings schematically illustrating examples of controlling a speed of the autonomous vehicle in response to receiving blind spot stereoscopic data from the server and determining that a region of interest corresponding to a specific event is included in the blind spot by referring to the blind spot stereoscopic data in accordance with one example embodiment of the present disclosure.
Figure 9B:
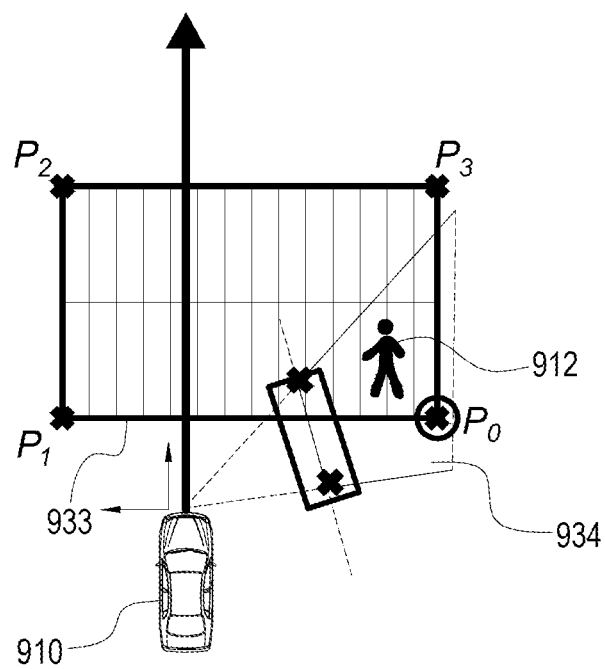

FIGS. 9A and 9B are drawings schematically illustrating examples of controlling the speed of the autonomous vehicle in response to receiving the blind spot stereoscopic data from the server 200 and determining that the region of interest corresponding to the specific event is included in the blind spot by referring to the blind spot stereoscopic data in accordance with one example embodiment of the present disclosure.

The drawings of FIG. 9A is illustrating a case where the blind spot is generated near a joining area. Herein, the computing device 100 of the autonomous vehicle 910 may first receive the blind spot stereoscopic data including data on the horizontal-direction occluding region and data on the vertical-direction occluding region, from the server 200. Then, when the region of interest 932 corresponding to the specific event 931 is determined to be included in the horizontal-direction occluding region and the vertical-direction occluding region, the computing device 100 may assume that a virtual vehicle 911 approaching to join the lane exists at the blind spot, and control the speed of the autonomous vehicle as a result by referring to a first estimated time to be taken for the autonomous vehicle 910 to encounter the specific event 931 and a second estimated time to be taken for the virtual vehicle 911 to encounter the specific event 931. Herein, in the case of the joining area, the specific event 931 would be at a joining point where the approaching virtual vehicle 911 is expected to join the same lane as the autonomous vehicle 910, and the region of interest 932 would be located behind the joining point by a predetermined distance. Herein, regardless of whether there actually is any vehicle joining the lane from the blind spot, assuming the approaching of the virtual vehicle from the blind spot and controlling the speed of the autonomous vehicle in advance would ensure safe operation of the autonomous vehicle.

Herein, in order to control the speed of the autonomous vehicle, time taken for the autonomous vehicle travelling with an initial speed of $v_0$ and a predetermined deceleration of $a_1$ to encounter the specific event 931 is defined as a (1_1)-st estimated time, and time taken for the autonomous vehicle travelling with an adjusted speed of $v_1$ and the predetermined deceleration of $a_1$ to stop is defined as a (1_2)-nd estimated time. Then, a (1_1)-st estimated distance corresponding to the (1_1) st estimated time is defined as a distance $d_{stop}$ left by the autonomous vehicle driving with the initial speed $v_0$ to encounter the specific event 931, and a (1_2)-nd estimated distance corresponding to the (1_2) nd estimated time is defined as a distance $d_{target}$ to a target stopping point left by the autonomous vehicle driving with the adjusted speed $v_1$. Accordingly, when the distance $d_{stop}$ is longer than the distance $d_{target}$, the adjusted speed $v_1$ is set as a safety speed $v_{safe}$ thereby controlling the speed of the autonomous vehicle by decreasing the speed of the autonomous vehicle to a target speed. Herein, the target speed may be a speed equal to or lower than the safety speed $v_{safe}$.

The drawings of FIG. 9B is illustrating a case where the blind spot is generated at the crosswalk. Herein, the computing device 100 of the autonomous vehicle 910 may first receive the blind spot stereoscopic data including data on the horizontal-direction occluding region and data on the vertical-direction occluding region, from the server 200. Then, when the region of interest 934 corresponding to the specific event 933 (i.e., the crosswalk) is included in the horizontal-direction occluding region and the vertical-direction occluding region, the computing device 100 may assume that a virtual pedestrian 912 entering the crosswalk exists at the blind spot, and control the speed of the autonomous vehicle as a result by referring to a first estimated time to be taken for the autonomous vehicle 910 to encounter the specific event 933 and a second estimated time to be taken for the virtual pedestrian 912 to encounter the specific event 933. Herein, regardless of whether there actually is any pedestrian entering the crosswalk in the blind spot, assuming the existence of the virtual pedestrian 912 in the blind spot and controlling the speed of the autonomous vehicle in advance would ensure the safe operation of the autonomous vehicle.

Herein, likewise to the case demonstrated in FIG. 9A, time taken for the autonomous vehicle travelling with an initial speed of $v_0$ and a predetermined deceleration of $a_1$ to encounter the specific event 933 is defined as a (1_1)-st estimated time, and time taken for the autonomous vehicle travelling with an adjusted speed of $v_1$ and the predetermined deceleration of $a_1$ to stop is defined as a (1_2)-nd estimated time. Then, a (1_1)-st estimated distance corresponding to the (1_1) st estimated time is defined as a distance $d_{stop}$ left by the autonomous vehicle driving with the initial speed $v_0$ to encounter the specific event 933, and a (1_2)-nd estimated distance corresponding to the (1_2) nd estimated time is defined as a distance $d_{target}$ to a target stopping point left by the autonomous vehicle driving with the adjusted speed $v_1$. Accordingly, when the distance $d_{stop}$ is longer than the distance $d_{target}$, the adjusted speed $v_1$ is set as a safety speed $v_{safe}$, thereby controlling the speed of the autonomous vehicle by decreasing the speed of the autonomous vehicle to a target speed. Herein, the target speed may be a speed equal to or lower than the safety speed $v_{safe}$.

The present disclosure has an effect of allowing the autonomous vehicle to receive the blind spot stereoscopic data, including data on the horizontal-direction occluding region and data on the vertical-direction occluding region, from the server.

The present disclosure has another effect of comparing the estimated time taken for the autonomous vehicle and the estimated time taken for the vertical object present in the blind spot to respectively encounter the specific event by referring to the blind spot stereoscopic data to thereby control the speed of the autonomous vehicle.

The present disclosure has still another effect of transmitting an installation location of the sensor on the autonomous vehicle, specifications of the sensor and location information of the autonomous vehicle to the server and receiving information on the blind spot as a result, thereby greatly saving the amount of data transmitted and received and enabling the autonomous vehicle to receive data on real-time while driving.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for driving in a blind spot of a sensor, mounted on an autonomous vehicle, via communication with a server, comprising steps of:
   (a) a computing device of the autonomous vehicle running on a specific road (i) locating the autonomous vehicle by using at least one of precision map information, sensor information and GPS (Global Positioning System) information, and (ii) in response to determining that the autonomous vehicle is expected to encounter a specific event within a specific time period as a result of locating the autonomous vehicle, transmitting vehicle location data corresponding to the result of locating the autonomous vehicle, sensor location data corresponding to a location where the sensor is mounted on the autonomous vehicle, direction data corresponding to a travelling direction of the autonomous vehicle, vehicle structure data of the autonomous vehicle and viewing angle data of the sensor to the server, to thereby query the server to determine whether a region of interest corresponding to the specific event to be encountered on the specific road is included in blind spot candidates for the blind spot of the sensor;
   (b) the computing device receiving blind spot stereoscopic data from the server, wherein the blind spot stereoscopic data is computed by referring to the vehicle location data, the sensor location data, the direction data, the vehicle structure data, the viewing angle data and three-dimensional (3D) occlusion environmental data corresponding to at least one occluding static object included in the blind spot candidates; and
   (c) the computing device controlling movement of the autonomous vehicle by referring to the blind spot stereoscopic data so that the autonomous vehicle drives in the blind spot,
   wherein, at the step of (b), the computing device acquires the blind spot stereoscopic data, including data on a horizontal-direction occluding region and data on a vertical-direction occluding region, from the server,
   wherein the computing device defines blind spot determining processes into a horizontal-direction blind spot determining process and a vertical-direction blind spot determining process, wherein (i) the horizontal-direction blind spot determining process determines the blind spot based on a horizontal plane comprised of an x-axis and a y-axis from the sensor installed on a certain location of the autonomous vehicle while a positive direction of the x-axis is assumed to be the travelling direction of the autonomous vehicle and a positive direction of the y-axis is assumed to be a left direction from the autonomous vehicle, and (ii) the vertical-direction blind spot determining process determines the blind spot based on a vertical plane comprised of the x-axis and a z-axis from the sensor installed on the certain location of the autonomous vehicle while the positive direction of the x-axis is assumed to be the travelling direction of the autonomous vehicle and a positive direction of the z-axis is assumed to be a direction vertically upwards from the autonomous vehicle, and
   wherein the computing device instructs the server to perform, as the horizontal-direction blind spot determining process, sub-processes of (i) acquiring coordinates of the sensor installed on the certain location, (ii) detecting a plurality of occlusion-related points, included within a horizontal-direction viewing angle of the sensor, among a plurality of points on boundary lines of a horizontal cross-section of the occluding static object included in the three-dimensional occluding environmental data and selecting a first linear line and a second linear line from a plurality of linear lines connecting the coordinates of the sensor to the plurality of occlusion-related points, wherein an angle between the first linear line and the second linear line is the biggest among angles between any two different linear lines selected from the plurality of linear lines and wherein the second linear line forms a smaller angle with the x-axis than the first linear line with the x-axis, (iii) defining an intersection between the first linear line and a boundary line of a side of the horizontal cross-section facing the autonomous vehicle and an intersection between the second linear line and the boundary line of the side of the horizontal cross-section facing the autonomous vehicle respectively as a first point and a second point, defining the first linear line and the second linear line respectively as $A_1X-Y+B_1=0$ and $A_2X-Y+B_2=0$, and defining a third linear line connecting the first point and the second point as $A_3X-Y+B_3=0$, and (iv) determining whether the region of interest corresponding to the specific event is included in the horizontal-direction occluding region simultaneously satisfying inequations, $A_1X-Y+B_1<0, A_2X-Y+B_2>0, A_3X-Y+B_3>0$, of the first linear line to the third linear line, and then the computing device receives a result thereof from the server, and
   wherein the computing device instructs the server to perform, as the vertical-direction blind spot determining process, sub-processes of (i) acquiring the coordinates of the sensor installed on the certain location, (ii) detecting a plurality of occlusion-related points, included within a vertical-direction viewing angle of the sensor, among a plurality of points on boundary lines of a vertical cross-section of the occluding static object included in the three-dimensional occluding environmental data and selecting a fourth linear line and a fifth linear line from a plurality of linear lines connecting the coordinates of the sensor to the plurality of occlusion-related points, wherein an angle between the fourth linear line and the fifth linear line is the biggest among angles between any two different linear lines selected from the plurality of linear lines, (iii) defining an intersection between the fourth linear line and a boundary line of a side of the vertical cross-section facing the autonomous vehicle and an intersection between the fifth linear line and the boundary line of the side of the vertical cross-section facing the autonomous vehicle respectively as a fourth point and a fifth point wherein the fifth point is located closer to a ground than the fourth point to the ground, defining the fourth linear line and the fifth linear line respectively as $C_1X-Z+D_1=0$ and $C_2X-Z+D_2=0$, and defining a sixth linear line connecting the fourth point and the fifth point as $C_3X-Z+D_3=0$, and (iv) determining whether the region of interest corresponding to the specific event is included in the vertical-direction occluding region not surrounded by the fourth linear line, the fifth linear line and the sixth linear line, and then the computing device receives a result thereof from the server.

2. The method of claim 1, wherein, at the step of (a), in response to acquiring boundary surface information of the occluding static object by referring to the precision map information and determining that the boundary surface information satisfies a specific analysis-requiring condition, the computing device queries the server to determine whether the region of interest corresponding to the specific event is included in the blind spot candidates.

3. The method of claim 2, wherein (i) in response to determining that the occluding static object is a roadway-related occluding object, the computing device classifies the roadway-related occluding object into either a first-type roadway-related occluding object that separates a lane in the travelling direction of the autonomous vehicle from a lane in a direction opposite to the travelling direction of the autonomous vehicle or a second-type roadway-related occluding object that separates the lane in the travelling direction of the autonomous vehicle from an adjacent non-roadway, and then (i-1) in response to identifying the roadway-related occluding object as the first-type roadway-related occluding object, the computing device determines that the specific analysis-requiring condition is not met and decides not to query the server, or (i-2) in response to identifying the roadway-related occluding object as the second-type roadway-related occluding object, the computing device determines the specific analysis-requiring condition as satisfied when the boundary surface information of the occluding static object satisfies a specific first condition, to thereby query the server, and (ii) in response to determining that the occluding static object is a non-roadway-related occluding object, the computing device determines the specific analysis-requiring condition as satisfied when the boundary surface information of the occluding static object satisfies a specific second condition, to thereby query the server.

4. The method of claim 3, wherein (i) the first-type roadway-related occluding object includes central separating structures that prevent collisions between vehicles travelling in opposite directions from each other, (ii) the second-type roadway-related occluding object includes at least some of safety signs, artificial structures and road curbs that separate roadways and non-roadways, and (iii) the non-roadway-related occluding object includes at least some of buildings, utility poles and trees.

5. The method of claim 3, wherein the computing device acquires a two-dimensional vector, representing a location and a direction of the occluding static object in a plan view, as the boundary surface information of the occluding static object by referring to the precision map information, and wherein the computing device instructs the server to acquire a three-dimensional vector, representing a location and a direction of the occluding static object in a three-dimensional space, as the boundary surface information of the occluding static object by referring to three-dimensional precision map information, and thus receives the three-dimensional vector from the server.

6. The method of claim 1, wherein, at the step of (c), in response to determining that the region of interest corresponding to the specific event is included in the blind spot by referring to the blind spot stereoscopic data received from the server, the computing device assumes that a virtual moving object exists within the blind sport, and controls a speed of the autonomous vehicle by referring to a first estimated time to be taken for the autonomous vehicle to encounter the specific event and a second estimated time to be taken for the virtual moving object to encounter the specific event.

7. The method of claim 6, wherein (i) (i-1) time taken for the autonomous vehicle travelling with an initial speed of $v_0$ and a predetermined deceleration of $a_1$ to encounter the specific event is defined as a (1_1)-st estimated time, and time taken for the autonomous vehicle travelling with an adjusted speed of $v_1$ and the predetermined deceleration of $a_1$ to stop is defined as a (1_2)-nd estimated time, and (i-2) a (1_1)-st estimated distance corresponding to the (1_1)_st estimated time is defined as a distance $d_{stop}$ left by the autonomous vehicle driving with the initial speed $v_0$ to encounter the specific event, and a (1_2)-nd estimated distance corresponding to the (1_2)_nd estimated time is defined as a distance $d_{target}$ to a target stopping point left by the autonomous vehicle driving with the adjusted speed $v_1$, and (ii) when the distance $d_{stop}$ is longer than the distance $d_{target}$, the adjusted speed $v_1$ is set as a safety speed $v_{safe}$, thereby controlling the speed of the autonomous vehicle by decreasing the speed of the autonomous vehicle to a target speed.

8. A computing device for driving in a blind spot of a sensor, mounted on an autonomous vehicle running on a specific road, via communication with a server, comprising:
at least one memory that stores instructions; and
at least one processor configured to execute the instructions to perform or support another device to perform:
(I) (i) a process of locating the autonomous vehicle by using at least one of precision map information, sensor information and GPS (Global Positioning System) information, and (ii) in response to determining that the autonomous vehicle is expected to encounter a specific event within a specific time period as a result of locating the autonomous vehicle, a process of transmitting vehicle location data corresponding to the result of locating the autonomous vehicle, sensor location data corresponding to a location where the sensor is mounted on the autonomous vehicle, direction data corresponding to a travelling direction of the autonomous vehicle, vehicle structure data of the autonomous vehicle and viewing angle data of the sensor to the server, to thereby query the server to determine whether a region of interest corresponding to the specific event to be encountered on the specific road is included in blind spot candidates for the blind spot of the sensor,
(II) a process of receiving blind spot stereoscopic data from the server, wherein the blind spot stereoscopic data is computed by referring to the vehicle location data, the sensor location data, the direction data, the vehicle structure data, the viewing angle data and three-dimensional (3D) occlusion environmental data corresponding to at least one occluding static object included in the blind spot candidates, and (III) a process of controlling movement of the autonomous vehicle by referring to the blind spot stereoscopic data so that the autonomous vehicle drives in the blind spot,
wherein, at the process of (II), the processor acquires the blind spot stereoscopic data, including data on a horizontal-direction occluding region and data on a vertical-direction occluding region, from the server, wherein the processor defines blind spot determining processes into a horizontal-direction blind spot determining process and a vertical-direction blind spot determining process, wherein (i) the horizontal-direction blind spot determining process determines the blind spot based on a horizontal plane comprised of an x-axis and a y-axis from the sensor installed on a certain location of the autonomous vehicle while a positive direction of the x-axis is assumed to be the travelling direction of the autonomous vehicle and a positive direction of the y-axis is assumed to be a left direction from the autonomous vehicle, and (ii) the vertical-direction blind spot determining process determines the blind spot based on a vertical plane comprised of the x-axis and a z-axis from the sensor installed on the certain location of the autonomous vehicle while the positive direction of the x-axis is assumed to be the travelling direction of the autonomous vehicle and a positive direction of the z-axis is assumed to be a direction vertically upwards from the autonomous vehicle, and wherein the processor instructs the server to perform, as the horizontal-direction blind spot determining process, sub-processes of (i) acquiring coordinates of the sensor installed on the certain location, (ii) detecting a plurality of occlusion-related points, included within a horizontal-direction viewing angle of the sensor, among a plurality of points on boundary lines of a horizontal cross-section of the occluding static object included in the three-dimensional occluding environmental data and selecting a first linear line and a second linear line from a plurality of linear lines connecting the coordinates of the sensor to the plurality of occlusion-related points, wherein an angle between the first linear line and the second linear line is the biggest among angles between any two different linear lines selected from the plurality of linear lines and wherein the second linear line forms a smaller angle with the x-axis than the first linear line with the x-axis, (iii) defining an intersection between the first linear line and a boundary line of a side of the horizontal cross-section facing the autonomous vehicle and an intersection between the second linear line and the boundary line of the side of the horizontal cross-section facing the autonomous vehicle respectively as a first point and a second point, defining the first linear line and the second linear line respectively as $A_1X-Y+B_1=0$ and $A_2X-Y+B_2=0$, and defining a third linear line connecting the first point and the second point as $A_3X-Y+B_3=0$, and (iv) determining whether the region of interest corresponding to the specific event is included in the horizontal-direction occluding region simultaneously satisfying inequations, $A_1X-Y+B_1<0, A_2X-Y+B_2>0, A_3X-Y+B_3>0$, of the first linear line to the third linear line, and then the processor receives a result thereof from the server, and wherein the processor instructs the server to perform, as the vertical-direction blind spot determining process, sub-processes of (i) acquiring the coordinates of the sensor installed on the certain location, (ii) detecting a plurality of occlusion-related points, included within a vertical-direction viewing angle of the sensor, among a plurality of points on boundary lines of a vertical cross-section of the occluding static object included in the three-dimensional occluding environmental data and selecting a fourth linear line and a fifth linear line from a plurality of linear lines connecting the coordinates of the sensor to the plurality of occlusion-related points, wherein an angle between the fourth linear line and the fifth linear line is the biggest among angles between any two different linear lines selected from the plurality of linear lines, (iii) defining an intersection between the fourth linear line and a boundary line of a side of the vertical cross-section facing the autonomous vehicle and an intersection between the fifth linear line and the boundary line of the side of the vertical cross-section facing the autonomous vehicle respectively as a fourth point and a fifth point wherein the fifth point is located closer to a ground than the fourth point to the ground, defining the fourth linear line and the fifth linear line respectively as $C_1X-Z+D_1=0$ and $C_2X-Z+D_2=0$, and defining a sixth linear line connecting the fourth point and the fifth point as $C_3X-Z+D_3=0$, and (iv) determining whether the region of interest corresponding to the specific event is included in the vertical-direction occluding region not surrounded by the fourth linear line, the fifth linear line and the sixth linear line, and then the processor receives a result thereof from the server.

9. The device of claim 8, wherein, at the processes of (I), in response to acquiring boundary surface information of the occluding static object by referring to the precision map information and determining that the boundary surface information satisfies a specific analysis-requiring condition, the processor queries the server to determine whether the region of interest corresponding to the specific event is included in the blind spot candidates.

10. The device of claim 9, wherein (i) in response to determining that the occluding static object is a roadway-related occluding object, the processor classifies the roadway-related occluding object into either a first-type roadway-related occluding object that separates a lane in the travelling direction of the autonomous vehicle from a lane in a direction opposite to the travelling direction of the autonomous vehicle or a second-type roadway-related occluding object that separates the lane in the travelling direction of the autonomous vehicle from an adjacent non-roadway, and then (i-1) in response to identifying the roadway-related occluding object as the first-type roadway-related occluding object, the processor determines that the specific analysis-requiring condition is not met and decides not to query the server, or (i-2) in response to identifying the roadway-related occluding object as the second-type roadway-related occluding object, the processor determines the specific analysis-requiring condition as satisfied when the boundary surface information of the occluding static object satisfies a specific first condition, to thereby query the server, and (ii) in response to determining that the occluding static object is a non-roadway-related occluding object, the processor determines the specific analysis-requiring condition as satisfied when the boundary surface information of the occluding static object satisfies a specific second condition, to thereby query the server.

11. The device of claim 10, wherein (i) the first-type roadway-related occluding object includes central separating structures that prevent collisions between vehicles travelling in opposite directions from each other, (ii) the second-type roadway-related occluding object includes at least some of safety signs, artificial structures and road curbs that separate roadways and non-roadways, and (iii) the non-roadway-related occluding object includes at least some of buildings, utility poles and trees.

12. The device of claim 10, wherein the processor acquires a two-dimensional vector, representing a location and a direction of the occluding static object in a plan view, as the boundary surface information of the occluding static object by referring to the precision map information, and wherein the processor instructs the server to acquire a three-dimensional vector, representing a location and a direction of the occluding static object in a three-dimensional space, as the boundary surface information of the occluding static object by referring to three-dimensional precision map information, and thus receives the three-dimensional vector from the server.

13. The device of claim 8, wherein, at the process of (III), in response to determining that the region of interest corresponding to the specific event is included in the blind spot by referring to the blind spot stereoscopic data received from the server, the processor assumes that a virtual moving object exists within the blind sport, and controls a speed of the autonomous vehicle by referring to a first estimated time to be taken for the autonomous vehicle to encounter the specific event and a second estimated time to be taken for the virtual moving object to encounter the specific event.

14. The device of claim 13, wherein (i) (i-1) time taken for the autonomous vehicle travelling with an initial speed of $v_0$ and a predetermined deceleration of $a_1$ to encounter the specific event is defined as a (1_1)-st estimated time, and time taken for the autonomous vehicle travelling with an adjusted speed of $v_1$ and the predetermined deceleration of $a_1$ to stop is defined as a (1_2)-nd estimated time, and (i-2) a (1_1)-st estimated distance corresponding to the (1_1)_st estimated time is defined as a distance $d_{stop}$ left by the autonomous vehicle driving with the initial speed $v_0$ to encounter the specific event, and a (1_2)-nd estimated distance corresponding to the (1_2)_nd estimated time is defined as a distance $d_{target}$ to a target stopping point left by the autonomous vehicle driving with the adjusted speed $v_1$, and (ii) when the distance $d_{stop}$ is longer than the distance $d_{target}$, the adjusted speed $v_1$ is set as a safety speed $v_{safe}$, thereby controlling the speed of the autonomous vehicle by decreasing the speed of the autonomous vehicle to a target speed.

* * * * *